United States Patent
Konno (10) Patent No.: US 6,943,966 B2
(45) Date of Patent: Sep. 13, 2005

(54) OPTICAL COMPONENT AND IMAGE PICK-UP DEVICE USING THE SAME

(75) Inventor: Mitsujiro Konno, Hino (JP)

(73) Assignee: Olympus Corporation, Tokyo (JP)

(*) Notice: Subject to any disclaimer, the term of this patent is extended or adjusted under 35 U.S.C. 154(b) by 877 days.

(21) Appl. No.: 09/984,243

(22) Filed: Oct. 29, 2001

(65) Prior Publication Data

US 2003/0043289 A1 Mar. 6, 2003

(30) Foreign Application Priority Data

Jun. 4, 2001 (JP) .................................. 2001-167760

(51) Int. Cl.[7] .............................................. G02B 7/02
(52) U.S. Cl. .................... 359/819; 359/813; 359/814; 359/824
(58) Field of Search ................................ 359/819, 811, 359/814, 813, 824, 822, 823

(56) References Cited

U.S. PATENT DOCUMENTS

| | | | |
|---|---|---|---|
| 4,312,572 A | | 1/1982 | Yamashita et al. |
| 5,923,480 A | * | 7/1999 | Labeye ........................ 359/814 |
| 6,710,949 B2 | * | 3/2004 | Ohtaka ........................ 359/822 |
| 6,806,988 B2 | * | 10/2004 | Onuki et al. ................ 359/253 |

FOREIGN PATENT DOCUMENTS

| | | |
|---|---|---|
| JP | 61-44283 | 10/1986 |
| JP | 4-218012 | 8/1992 |

* cited by examiner

Primary Examiner—Hung Xuan Dang
(74) Attorney, Agent, or Firm—Arnold International; Bruce Y. Arnold (57) ABSTRACT

An optical component and an image pick-up device that uses the optical component is disclosed. The optical component is capable of driving an optical lens element that is mounted within a first aperture of the optical component. The optical component includes a frame which includes the first aperture. Flexible supports attach the frame to a fixed structure so that the frame may be moved axially, or moved axially as well as rotated, while being held at a fixed radial position along an axis. The optical component includes a base having a second aperture therein that is substantially aligned with the first aperture. First and second electrodes are positioned on the frame and the base, respectively, and a voltage source is provided for generating an electric field between the electrodes, so as to cause the frame to move axially with respect to the base. By subdividing one of the electrodes, a torque can be applied using electrostatic forces to cause the frame to move axially and rotate, while remaining fixed in radial position with respect to the axis.

21 Claims, 10 Drawing Sheets

OPTICAL COMPONENT AND IMAGE PICK-UP DEVICE USING THE SAME

BACKGROUND OF THE INVENTION

Recently, small electronic endoscopes which use a solid-state image pick-up element, such as a CCD (charge-coupled device), have become popular. Such small electronic endoscopes enable many people to observe objects such as lesions within a body-cavity by viewing on a display such as a T.V. monitor detected images that are obtained using the electronic endoscope. This has the great advantage of allowing observation and diagnosis by a team of doctors, as well as enabling the patient to also observe what is being viewed using the endoscope.

Among such endoscopes, a so-called "magnifying-type endoscope" has attracted recent attention. Such an endoscope enables better diagnosing of the degree of infiltration (termed the 'resection range') of minute lesions as well as the observation of their micro structures.

Prior art examples of optical systems for magnifying-type endoscopes are disclosed in Japan Tokkyo S61-44283, and in Japan Kokai H4-218102. These optical systems have three or four lens groups, respectively. The magnification can be changed in order to observe lesion sites at an even higher magnification by axially displacing a specific lens element within the optical systems.

Figure 12:
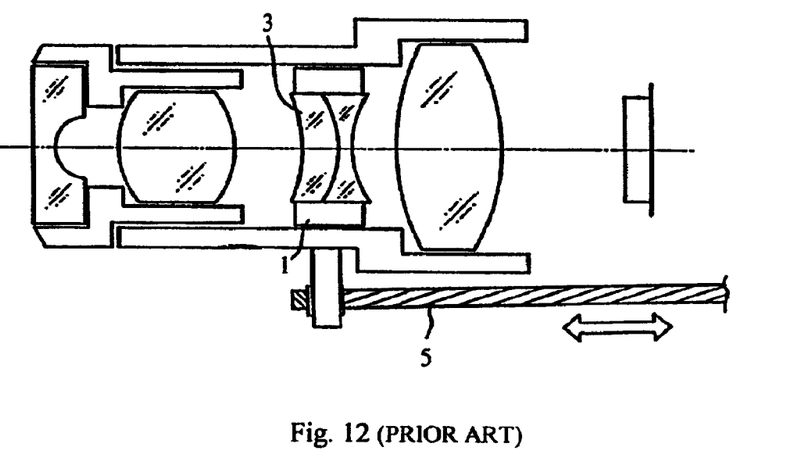
FIG. 12 is a diagram showing a method for driving a lens in a conventional magnifying-type endoscope.

A method for driving lenses in a conventional magnification-type endoscope is shown in FIG. 12. As illustrated in FIG. 12, a frame 1 for slidably holding a negative lens element or a negative cemented lens 3 in the optical system is combined with a wire 5, and the negative lens element or negative cemented lens may be moved in directions along the optical axis by pushing or pulling on the wire. This enables one to vary not only the magnification of the optical system, but also the working distance of the optical system and thus allows for variability in the range of observation.

Figure 13:
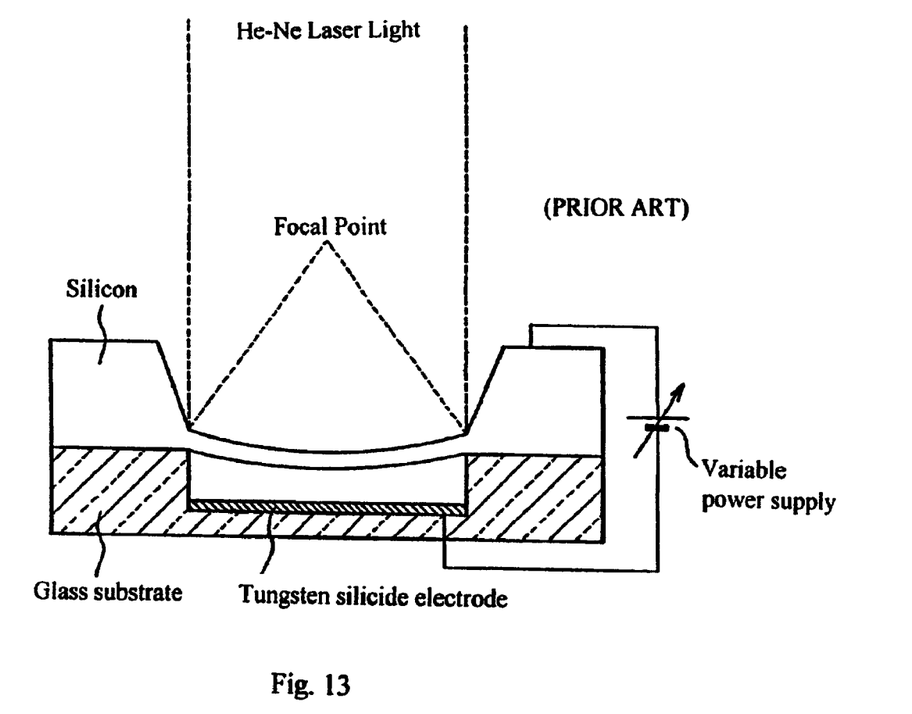
FIG. 13 is a cross-sectional view of a conventional variable-focus concave mirror; and, FIG. 14 illustrates the electrode 12 of FIG. 2 being segmented into four quadrants, so as to enable a torque to be applied to the frame 2 in order to adjust the viewing direction of the optical system.

On the other hand, more recently, a study using a so called MEMS (Micro Electro-mechanical Systems) technique for realizing micro actuator elements has been advanced by using a semiconductor manufacturing process. An example of utilizing this technique is shown in FIG. 13, which shows a cross-sectional view of a variable-focus concave mirror. In FIG. 13, a glass substrate is etched within a circular area so as to form a cylindrical depression, and a tungsten silicide electrode is deposited on the surface of the glass substrate within the depression so as to leave an open cylindrical region above the tungsten silicide electrode. A silicon layer is affiixed to the surface of the glass substrate. The silicon layer is then etched in a region immediately above the cylindrical region so as to leave a thin layer of silicon. Thus, the thin layer of silicon spans the area above the tungsten silicide electrode. Next, a metal film is applied to the surface of the silicon layer. The metal film serves as a mirror in the circular center region and as an electrode in the circular center region and in a peripheral region. Thus, the silicon layer is supported at the peripheral region by the glass substrate, and can be deformed to different degrees by an electrostatic force between the tungsten silicide electrode and the metal electrode on the surface of the silicon. In this way, a concave mirror can be formed by the deflection of the thin silicon layer above the tungsten silicide electrode, with the focal length being adjustable depending on the voltage difference between the tungsten silicide electrode and the metal film. A variable voltage supply is provided in order to vary this difference in voltage. In this way, the working distance of an optical system which employs the concave mirror as a focus adjustment element may be varied.

A magnifying-type endoscope has a large diameter as compared to other endoscopes. In addition to the diameter needed to accommodate the lens elements in a conventional endoscope, a magnifying-type endoscope must also provide room for the wire used to adjust the magnification/working distance of the optical system. It would be very desirable, therefore, to retain the diagnostic benefits of a conventional, magnifying-type endoscope, while reducing the diameter required of such an endoscope by omitting the wire.

If, as a means for solving this problem, a variable-focus concave mirror as discussed above were to be adapted for use in an endoscope optical system as shown in FIG. 12, there would remain a drawback, in a straight path optical system, in that the radial dimension required of the concave mirror would be too large. Moreover, there would also be a problem in that the image would be a reverse image because of the single reflection. Furthermore, using the above prior art design, it would be difficult to obtain sufficient deformation of the mirror surface in order to adjust the magnification and working distance of an endoscope simply by using electrostatic forces.

BRIEF SUMMARY Of THE INVENTION

The present invention relates to an optical component of an image pick-up device and an image pick-up optical system that uses the optical component. More particularly, the present invention is an optical system that uses a solid-state image pick-up element and which forms enlarged images, wherein the magnification and working distance of the image pick-up optical system may be varied. The object of the present invention is to realize a magnifying-type endoscope using conventional MEMS techniques as described above, and to provide a smaller diameter, magnifying-type endoscope than previously available, and which has a diagnostic capability at least as good as the diagnostic capability of a conventional magnifying-type endoscope.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
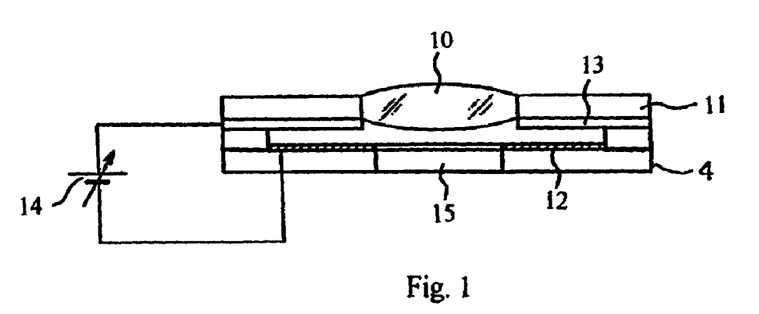
FIG. 1 is a longitudinal cross-sectional view of an optical component according to the present invention.

FIG. 1 shows a longitudinal cross-sectional view of an optical component according to the present invention. An upper substrate 11 holds a focus-adjustment lens element 10 by means of a frame and plate spring arrangement (discussed below) that may be formed of a metal sheet. A doped silicon layer forms an electrode 13 that is formed on the lower side of the substrate 11. Spacers support the upper substrate 11 and electrode 13 above a lower base 4. Lower base 4 includes a circular aperture 15 that extends through the lower base 4, as well as an electrode 12 which faces the electrode 13. Opposite polarities of a variable voltage source 14 (FIG. 1) are connected to the electrodes 12 and 13. The variable voltage source 14 enables the entire frame and the focus-adjustment lens element 10 to be driven by electrostatic forces which are generated between the electrodes 12 and 13 according to the polarity and amount of the applied voltage.

Figure 2:
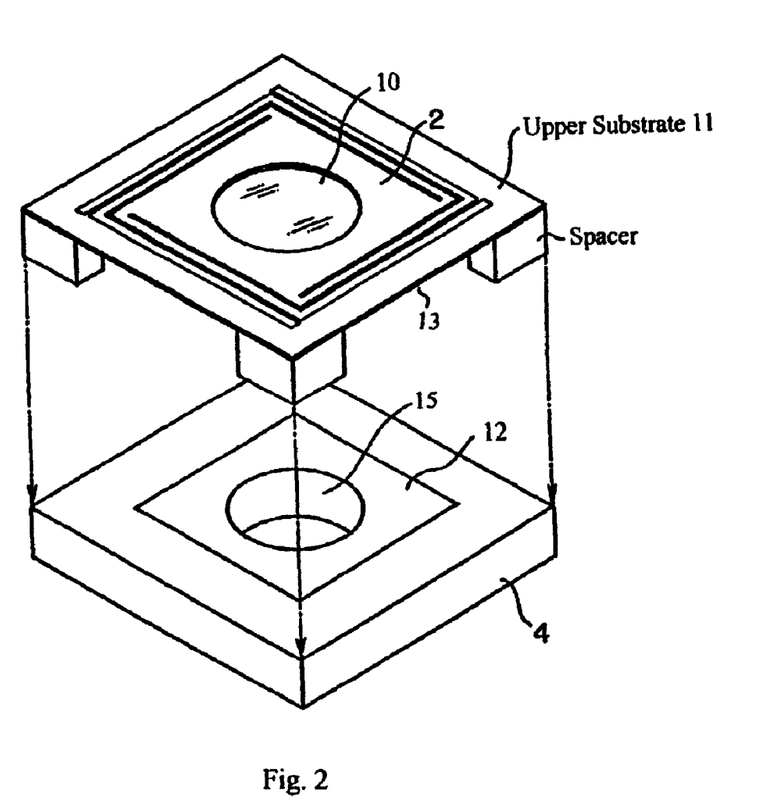
FIG. 2 is a partially exploded, oblique view the optical component shown in FIG. 1.

Referring to FIG. 2, the circular aperture 15 is formed in a part of the base 4 that is aligned with the focus-adjustment lens 10 so as to not block light passing to or from it. This enables one to form an image onto a solid-state image pick-up element (not illustrated) without the necessity of folding the optical path, as would otherwise be required. Moreover, if greater freedom of optical design is required, another lens element (such as a cemented lens) may be mounted within the circular aperture 15.

Figure 3A:
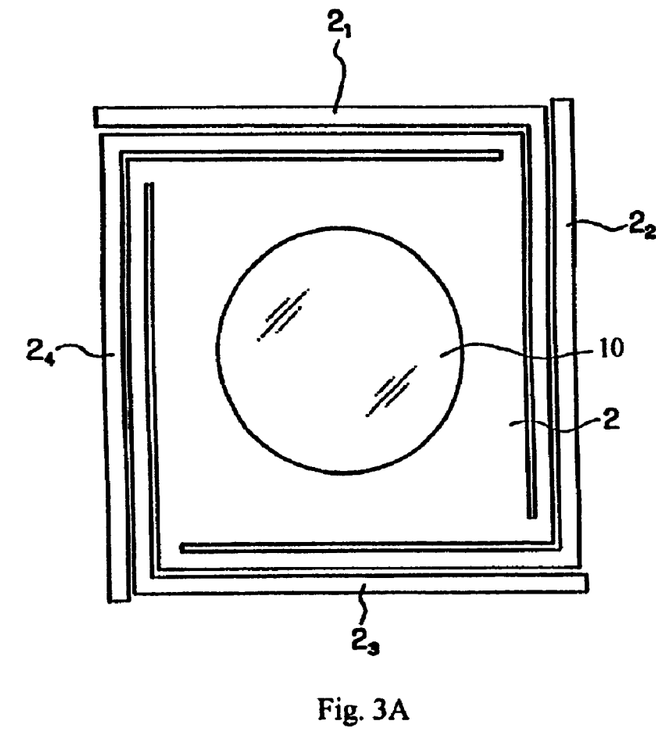
FIGS. 3A and 3B illustrate, in front and oblique views, respectively, the metal frame and spring supports that support a focus adjustment lens element of the optical component of FIG. 1.
Figure 3B:
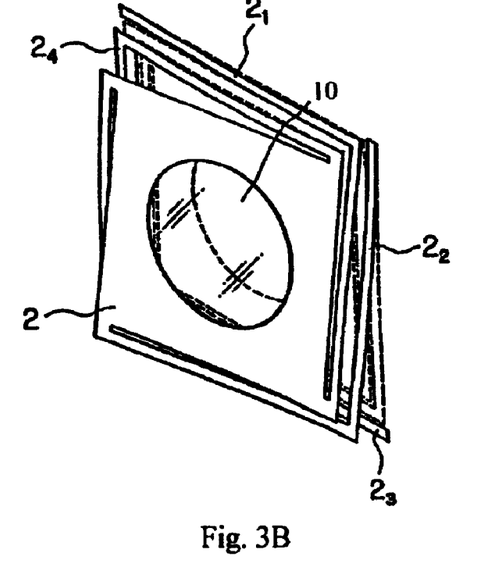

The focus adjustment lens element 10 is held within the metal frame 2 (FIG. 2) which, in turn, is supported by plate springs. The metal frame and plate springs may be formed from the upper substrate 11 by photo-etching, for example. The metal frame 2 and plate springs are best illustrated in FIGS. 3A and 3B. The metal frame 2 is approximately square-shaped, with L-shaped plate springs $2_1$–$2_4$ extending from respective corners so as to enclose two sides of the metal frame. When the tips of the plate springs $2_1$–$2_4$ are attached or fixed to the upper substrate, it is possible to deform the springs as shown in FIG. 3B. Thus, the focus adjustment lens element 10, when supported by the metal frame 2, may be driven in either direction along the optical axis of the focus-adjustment lens element 10.

The above-described construction provides a magnifying-type endoscope having an optical system with a smaller diameter than previously available, since no wire is used to adjust the focal length of the optical system. However, the shape of the frame 2 illustrated in FIGS. 2, 3A and 3B is not optimum, as further minimization of size is possible. Ideally, the periphery of the frame 2 should be roughly the same shape as the periphery of the focus adjustment lens element 10.

Figure 4:
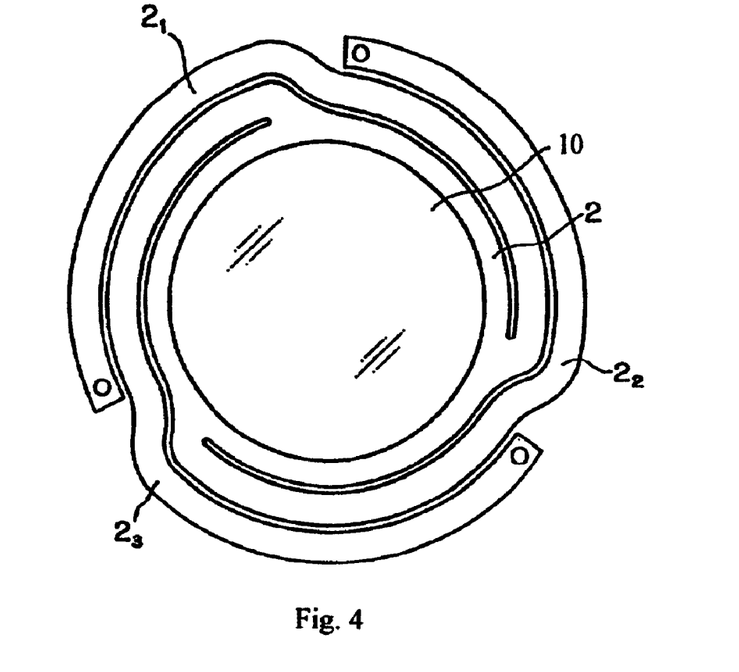
FIG. 4 shows another example of a metal frame and spring supports that support a focus adjustment lens element of an optical component according to a different embodiment of the present invention.

FIG. 4 shows a preferred embodiment for the frame 2. Of course, the shape and size of the lower base 4 should correspond to that of the frame 2. As illustrated in FIG. 4, three plate springs $2_1$–$2_3$ extend in an arc of about 240 degrees around the periphery from each 120 degree sector of a circular frame 2 which supports the focus adjustment lens element 10.

In order to realize a small-sized, magnifying-type endoscope, it is important that the optical component which supports the focusing lens be properly designed. When an optical component according to the present invention is utilized in such an endoscope, high compatibility is achieved with regard to changing the working distance of a magnifying-type endoscope by providing, in order from the object side, a first lens group and a second lens group, each having positive refractive power, with the optical component which supports the focusing lens element being in the second lens group.

Endoscope optical systems which provide magnified images to the viewer are commonly divided into two types, namely, a type wherein a positive lens is displaced along the optical axis in order to change the magnification/working distance, and a type wherein a negative lens is displaced along the optical axis in order to change the magnification/working distance. In the present invention, the displacement of the focus-adjustment lens element is rather small and is accomplished using electrostatic forces. This effectively limits the adjustment lens to one having positive refractive power. If a negative lens were to be used as the adjustment lens, the range of displacement of the adjustment lens would become too large.

Accordingly, in the present invention, it is desirable that the adjustment lens be of positive refractive power. Also, it is desirable that the adjustment lens be positioned at the pupil position. This increases the ray heights that are incident into the adjustment lens and thus makes it most effective for a given refractive power. Also, it is desirable that a lens shutter for setting the proper shutter speed be arranged before or after the adjustment lens.

Moreover, it is desirable that the mass of the adjustment lens be small. Thus, the following Condition (1) should be satisfied:

$$m_2 < 30 \text{ (mg)} \qquad \text{Condition (1)}$$

where $m_2$ is the mass of the adjustment lens.

Of course, the smaller the mass of the adjustment lens, the faster the movement response will be for a given electrostatic driving force. Therefore, it is more desirable that the following Condition (2) be satisfied:

$$m_2 < 20 \text{ (mg)} \qquad \text{Condition (2)}$$

where $m_2$ is as defined above.

It is, in fact, most desirable that the following Condition (3) be satisfied:

$$m_2 < 10 \text{ (mg)} \qquad \text{Condition (3)}$$

where $m_2$ is as defined above.

Furthermore, the driving distance of the adjustment lens is limited to about 0.4 mm using the optical component of the present invention. Thus, it is necessary to carefully design the focal length $f_2$ of the second lens group, as well as the other optical components of the endoscope, so that such a small range of focus adjustment of the second lens group adequately adjusts the magnification/working distance of the endoscope.

For an endoscope optical system having a focal length of about 1.65 mm and a front focus length of about 0.4 mm, the adjusting ability necessary of an adjustment lens of such an endoscope must change the working distance from about 12 mm to about 2.5 mm. The variation in position of the image plane for such an optical system is given by the following Equations:

$$\Delta_{img} = \{1/(f_F + 2.5) - 1/(f_F + 12)\}f_L^2 \quad \text{Equation (1A)}$$

$$= 0.72 \text{ (mm)} \quad \text{Equation (1B)}$$

where $\Delta_{img}$ is the variation in position of the image plane with focusing, $f_L$ is the focal length of the optical system, and $f_F$ is the front focus length of the optical system.

Figure 5:
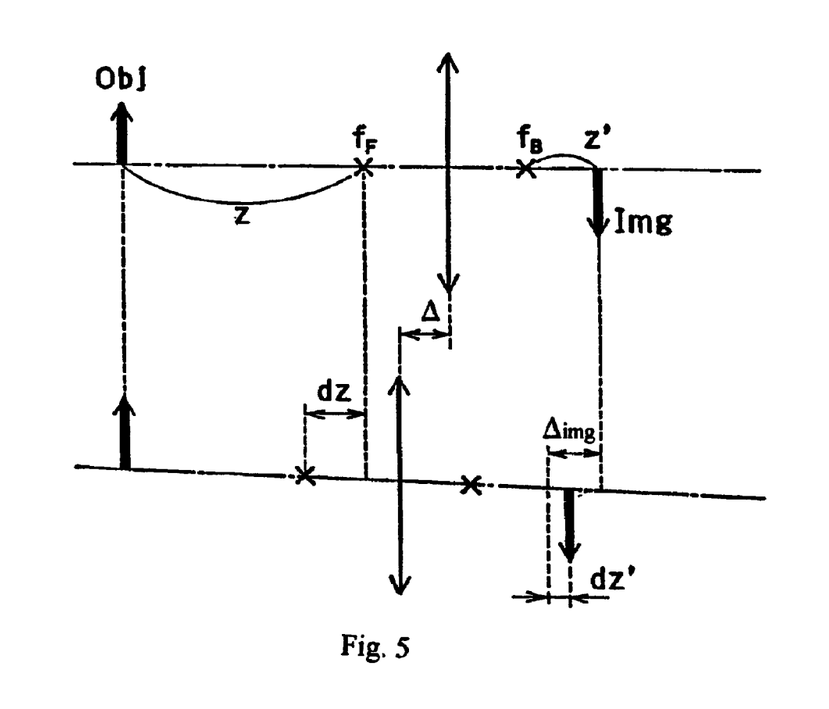
FIG. 5 is a diagram useful for calculating the sensitivity to focus shift in a rear-focus type lens.

On the one hand, the sensitivity k for the focus shift of a rear-focusing type lens may be calculated. A conceptual drawing is shown in FIG. 5. In FIG. 5, the imaging lens is illustrated by a double arrow, the object is illustrated by a single arrow labeled "Obj" and the image is illustrated by a single arrow labeled "Img". The Newton imaging relation is given by Equation (2) below:

$$Z'/Z = -\beta^2 \quad \text{Equation (2)}$$

where

Z is the distance of the object as measured from the front focus position of the imaging lens, Z' is the distance of the image as measured from the back focus position of the imaging lens, and $\beta$ is the magnification.

Multiplying both sides of Equation (2) by Z and taking the differentials dZ' and dZ yields:

$$dZ' = -\beta^2 dZ \quad \text{Equation (3)}$$

where dZ' is the corresponding change in the distance Z' given that Z changes by the amount dZ If the lens position is varied an amount $\Delta$ towards the object side, the distance Z to the object automatically decreases by $\Delta$, therefore:

$$dZ = -\Delta \quad \text{Equation (4).}$$

Accordingly, Equation (3) can be written:

$$dZ' = \Delta\beta^2 \quad \text{Equation (5).}$$

Because the lens position varies only by $\Delta$, the position of the image plane also varies only by $\Delta$. Thus $\Delta_{img}$ equals $\Delta$, and the focus shift is given by:

$$\text{Focus shift} = \Delta_{img} - dZ' = \Delta - dZ' \quad \text{Equation (6A)}$$

where $\Delta_{img}$, dZ', and $\Delta$ are as defined above.

Substituting the right side of Equation (5) for the dZ' in Equation (6A) and simplifying yields:

$$\text{Focus shift} = \Delta(1-\beta^2) \quad \text{Equation (6B)}$$

where $\Delta$ and $\beta$ are as defined above.

The movement of the lens is $\Delta$, therefore the ratio k of the focus shift divided by the movement of the lens is given as:

$$k = \Delta(1-\beta^2)/\Delta \quad \text{Equation (7A)}$$

$$= (1-\beta^2) \quad \text{Equation (7B)}$$

where k is the sensitivity ratio of the variation of the rear focusing position of the lens to the variation of image position, and $\beta$ is the magnification of the second lens group.

In the present invention, the variation of the rear focusing position of the lens is determined, for a given design of leaf springs, by the applied electrostatic force. The variation of focusing position, as described above, is about 0.4 mm. On the other hand, the focus adjustment $\Delta_{img}$ necessary for the endoscope is 0.72 mm (from Eq. (1B)). Therefore, the following condition must, ideally, be satisfied:

$$1.8 < k \quad \text{Condition (4)}$$

where k is as defined above.

From Eq. (7B) and Condition (4), it follows that:

$$1.8 < (1-\beta^2) \quad \text{Condition (5)}$$

becomes a condition which, ideally, should be satisfied for the endoscope.

However, since $\beta$ takes a finite value, it is very difficult to satisfy Condition (5). Thus, for the present invention, Condition (5) is necessarily relaxed to the following Condition (6):

$$0.9 < (1-\beta^2) \quad \text{Condition (6).}$$

It is desirable that the lens that is driven be as light in weight as possible due to the relatively low driving force that is available. For this reason, it is desirable that the driven lens be a single lens element having a relatively short focal length. On the other hand, if one calculates the required adjustment in magnification/working distance needed for a magnifying-type endoscope, it becomes apparent that a negative lens element will not provide the necessary range of focus adjustment. However, if the driven lens is a positive lens element, the necessary range of focus adjustment can be obtained.

Figure 6A:
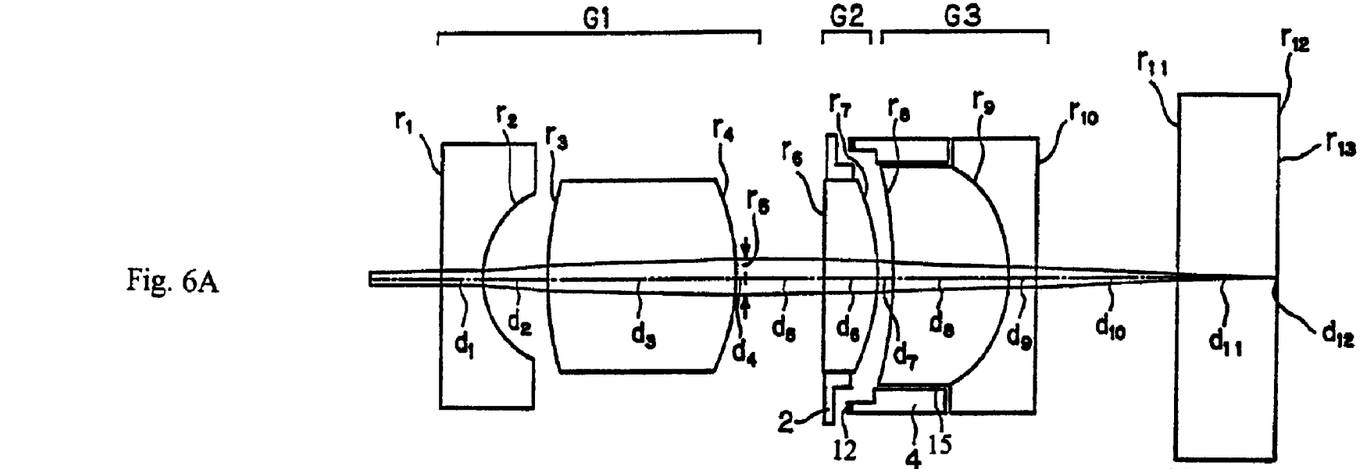
FIGS. 6A and 6B are cross-sectional views of a magnifying-type endoscope optical system of Embodiment 1 in common observation (i.e., low magnification), and proximity observation (high magnification), respectively.
Figure 6B:
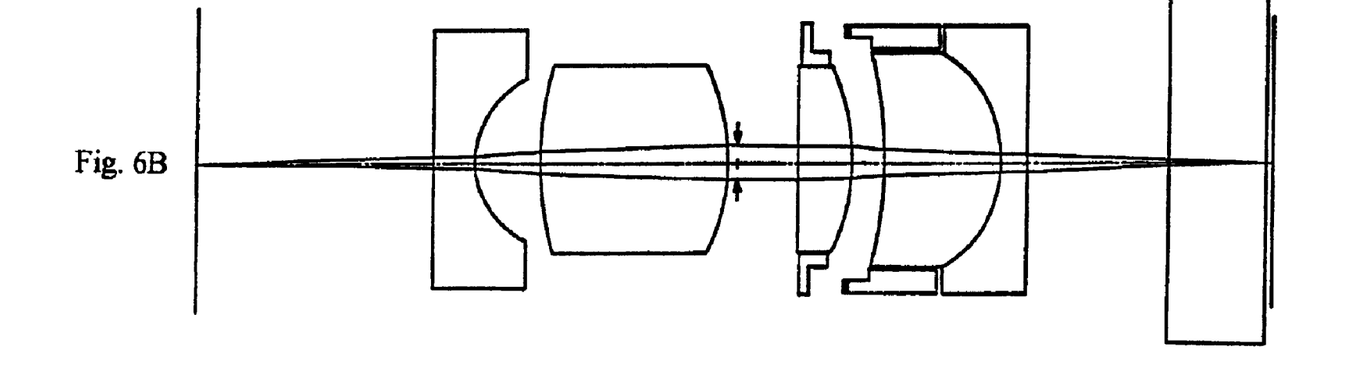
Figure 7A:
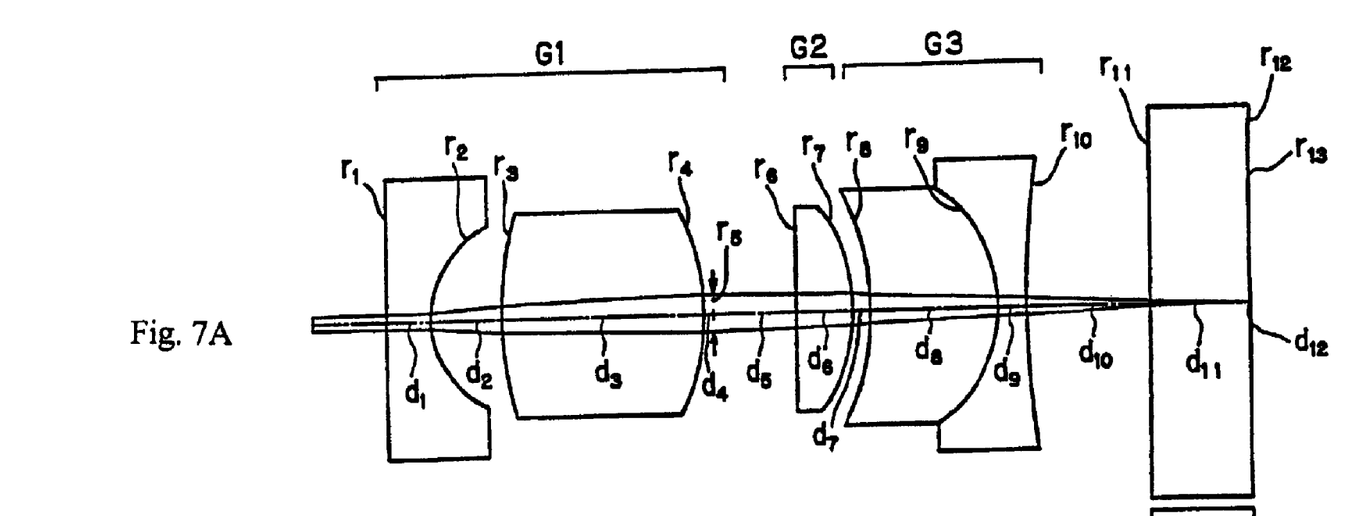
FIGS. 7A and 7B are cross-sectional views of a magnifying-type endoscope optical system of Embodiment 2 in common observation, and proximity observation, respectively.
Figure 7B:
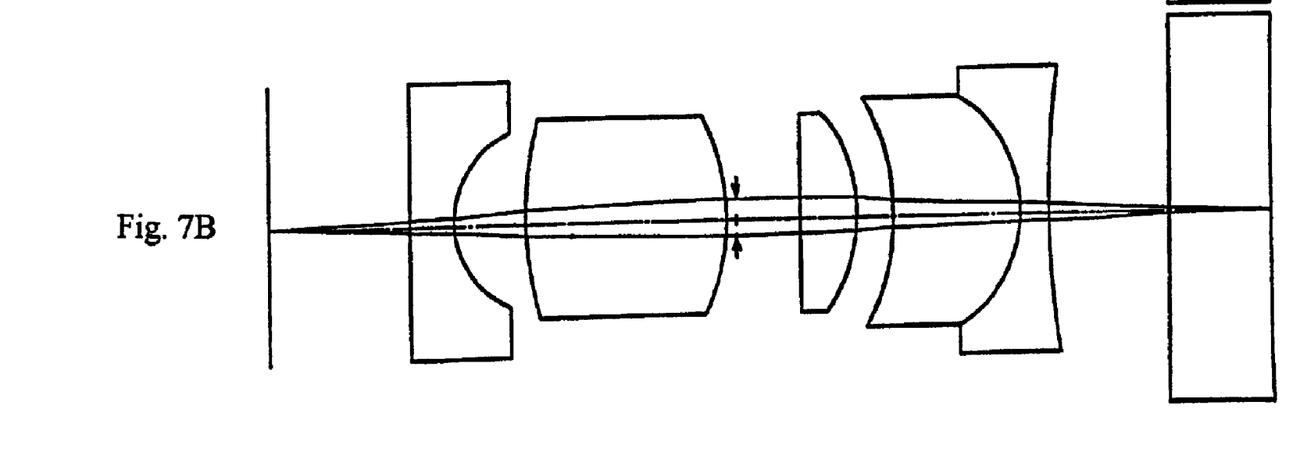
Figure 8A:
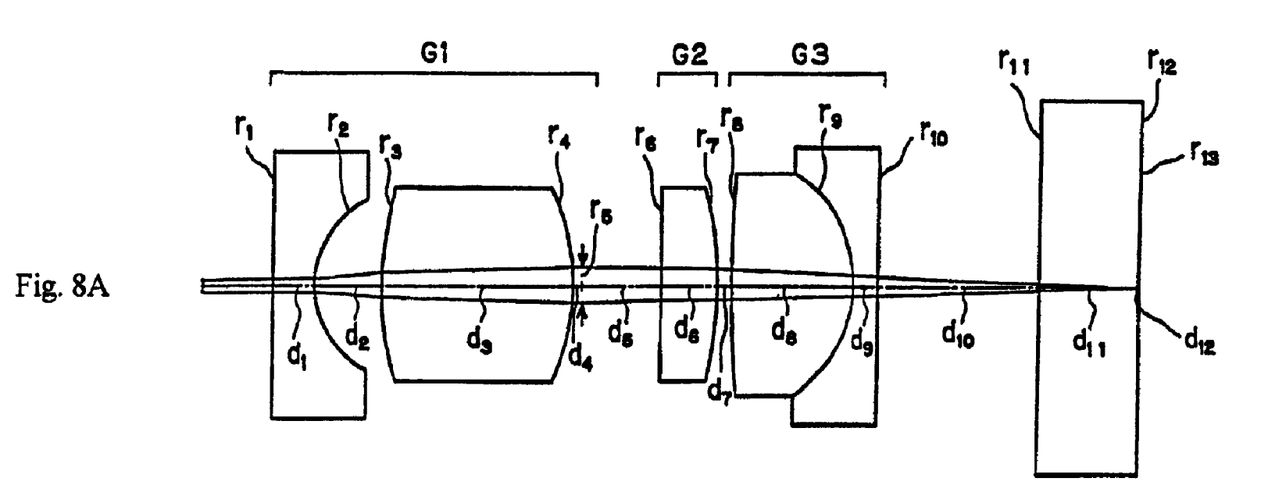
FIGS. 8A and 8b are cross-sectional views of a magnifying-type endoscope optical system of Embodiment 3 in common observation, and proximity observation, respectively.
Figure 8B:
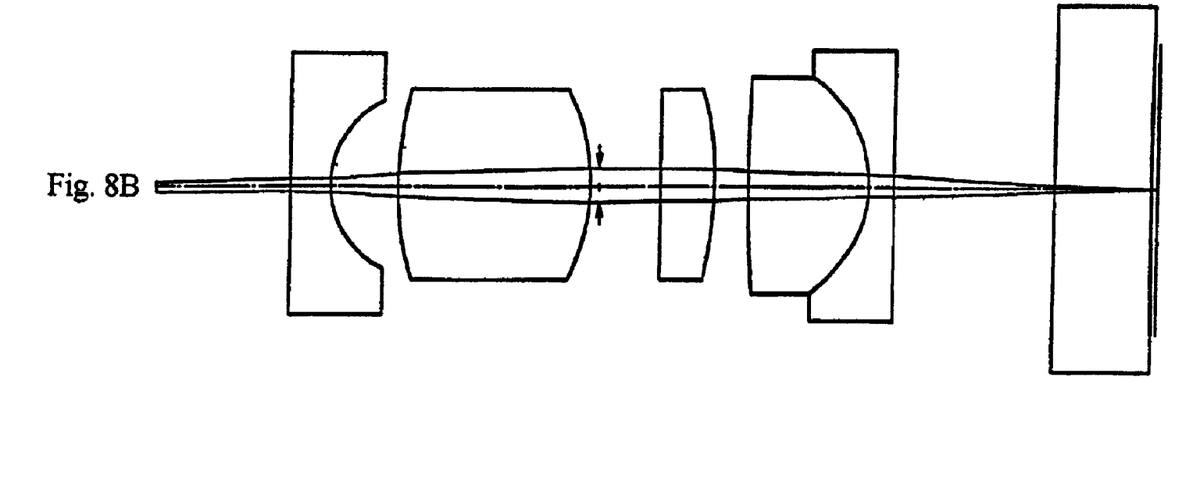

Because the circular aperture 15 is formed in the lower base 4 of the optical component, it is possible to arrange a third lens group in the circular aperture 15 so as to serve as a relay lens. FIGS. 6A and 6B are cross-sectional views of a magnifying-type endoscope optical system of Embodiment 1 (to be described in detail later). A final relay lens group G3 having a negative refractive power is arranged in the circular aperture 15 of lower base 4 in the light path following the second lens group G2, which second lens group has positive refractive power and a short focal length and is movable for adjustment of magnification/working distance.

In the arrangement shown in FIGS. 6A and 6B, wherein a third lens group G3 is provided as a final relay lens, the ratio k of the focus shift divided by the movement of the adjustment lens is given by:

$$k = (1-\beta^2)(\beta_R^2) \quad \text{Equation (8)}$$

where k and $\beta$ are as defined above, and $\beta_R$ is the magnification of the third lens group.

Substituting the right side of Equation (8) into Condition (4) yields:

$$1.8 < (1-\beta^2)(\beta_R^2) \quad \text{Condition (7)}$$

where

β is the magnification of the second lens group (i.e., the adjusting lens), and $\beta_R$ is the magnification of the third lens group.

As opposed to driving the second lens group of a two lens group construction, a three lens group construction as illustrated in FIGS. 6A and 6B allows Condition (4) to be fully satisfied.

Even if the right side of Condition (7) equals or is somewhat less than 1.8, this will be inconsequential to the use of an endoscope in proximity viewing, if the magnification is rather small. Thus, Condition (7) can be eased to the following condition:

$$1<(1-\beta^2)(\beta_R^2) \qquad \text{Condition (8)}$$

where

β is the magnification of the second lens group (i.e., the adjusting lens), and $\beta_R$ is the magnification of the third lens group.

On the other hand, the adjustment lens has a large focus shifting ability for a given driving distance if the focal length is short. Therefore, the following Conditions (9) and (10) must be satisfied:

$$1<f_2/f_{Lwide} \qquad \text{Condition (9)}$$

$$f_2/f_{Ltele}<2.9 \qquad \text{Condition (10)}$$

where $f_2$ is the focal length of the second lens group, $f_{Lwide}$ is the focal length of whole optical system in common observation (i.e., lowest magnification), and $f_{Ltele}$ is the focal length of whole optical system in a proximity observation (i.e., highest magnification).

If Condition (9) is not satisfied, the focal length of second lens group becomes too short, requiring an increase in the refractive power of the third lens group. As a result, it becomes difficult to suppress the occurrence of astigmatism. On the other hand, if Condition (10) is not satisfied, the focal length of the second lens group becomes too long, therefore the necessary amount of adjustment cannot be provided.

Embodiments 1–4 of a magnifying-type endoscope optical system based on the present invention are given in detail below. FIGS. 6A, 7A, 8A and 11A illustrate these optical systems in common observation (lowest magnifying power) and FIGS. 6B, 7B, 8B and 11B illustrate these optical systems in proximity observation (highest magnifying power).

As shown in FIGS. 6A–8B, each endoscope optical system of Embodiments 1 to 3 include, in order from the object side, a first lens group G1 having positive refractive power, a second lens group G2 having positive refractive power, and a third lens group G3 having negative refractive power. The magnification/working distance is varied by driving the second lens group G2, which is formed of a single plano-convex lens element, along the optical axis.

In Embodiments 1 to 3, the first lens group G1 is formed of, in order from the object side, a plano-concave lens element, a biconvex lens element, and a stop; and the second lens group consists of a single positive lens element having a mass of 10 mg or less.

In Embodiments 1 and 2, the third lens group G3 is formed of a meniscus lens element with its convex surface on the image side which is cemented to a biconcave lens element. In Embodiment 3, the third lens group G3 is formed of a biconvex lens element that is cemented to a biconcave lens element.

As illustrated only in FIGS. 6A and 6B, a lower base 4 with a circular aperture 15 is arranged so that the third lens group G3 is embedded in the circular aperture 15 so as to enclose the periphery of the third lens group. An electrostatic force positions the frame 2 of the second lens group G2 within a variable range along the optical axis, depending on the applied voltage. Thus, the second lens group G2 can be focused within a range of positions along the optical axis. By such a structure, the radial dimension of the optical systems of these embodiments can be roughly the same as the radial dimension of the prior art optical systems discussed above, even if the focusing element G2 is incorporated. Therefore, a variable magnification/working distance function can be added without widening the diameter of the endoscope.

As mentioned previously, the magnifying-type endoscopes in the above-discussed prior art examples have an extremely small depth of field and thus are difficult to use. Embodiments 1–3 of the present invention have the characteristic that the focal length during proximity observation is less than the focal length during common observation. This is favorable because the depth of field during proximity observation increases, as will be discussed below.

Figure 9:
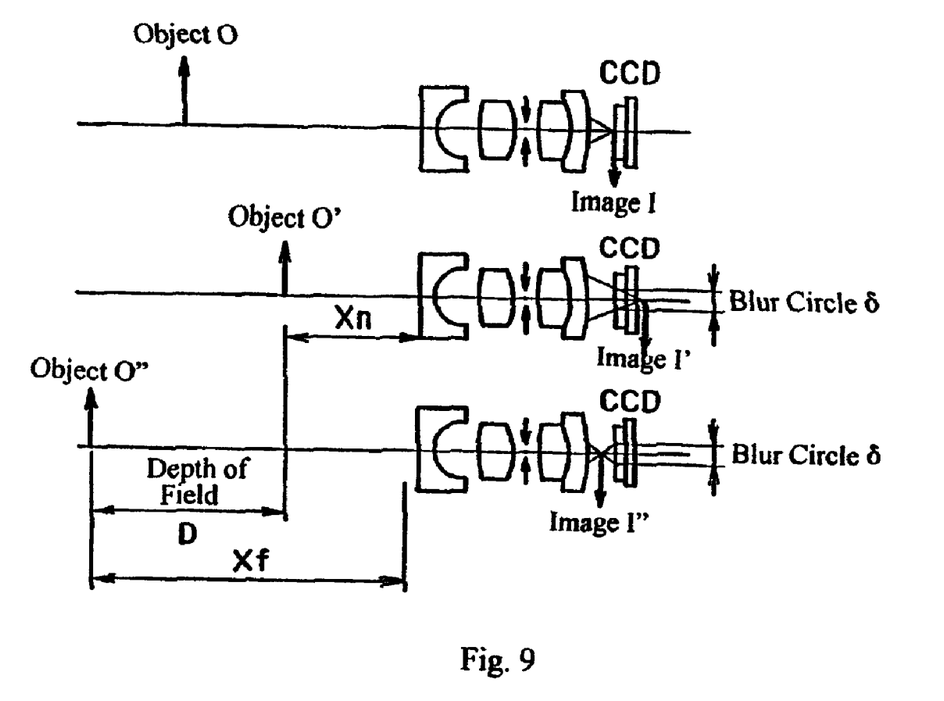
FIG. 9 is a diagram of an endoscope optical system for explaining depth of field.

The range that images are seemingly in focus is called the depth of field. FIG. 9 is a diagram of an endoscope optical system. In FIG. 9, an image I of an object O is formed at a surface of a CCD (Charge-Coupled Device) image detector. If the object position moves nearer the endoscope optical system to a position O', the image position deviates from the position I and instead is formed at the position I'. Conversely, if the object O moves away from the endoscope optical system to a position O", the image position deviates from the position I and instead is formed at the position I". If the position of the CCD is fixed, the images I' and I" are defocused at the surface of the CCD, and a blur circle having a diameter δ is formed. As long as the blur circle diameter δ is no larger than the minimum diameter spot that can be resolved by the CCD image detector, the images detected by the CCD image detector will seemingly be in focus. If the positions O' and O" are the limits of the blur circle being no larger than the minimum diameter spot that can be resolved by the CCD image detector, the following Equation (9) applies:

$$|1/X_n - 1/X_f| = (2\delta Fno)/f_L^2 \qquad \text{Equation (9)}$$

where $X_f$ is the far object distance, $X_n$ is the near object distance,

δ is the blur circle diameter,

Fno is the f-number of the endoscope optical system, and $f_L$ is the focal length of the endoscope optical system.

The depth of field D is given by Equation (10):

$$D = X_f - X_n \qquad \text{Equation (10)}$$

where $X_f$ and $X_n$ are as defined above.

Figure 10:
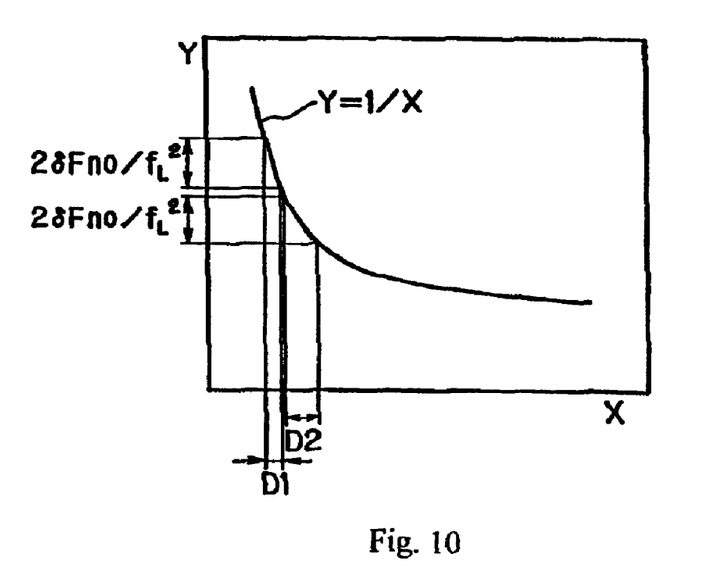
FIG. 10 is a diagram for illustrating a further decrease in depth of field of a magnifying-type endoscope during proximity observations.

FIG. 10 shows a diagram of the plot of Y=1/X. The value of $|1/X_n - 1/X_f|$ in Equation (9) shows the Y-direction dimension in FIG. 10. If this dimension (which, from the right side of Equation (9) equals $2\delta Fno/f_L^2$) is fixed, the depth of field D (FIG. 9) further decreases in the case of small $X_n$ (i.e., proximity viewing).

More specifically, as described in "Enlarged Issue/A to Z of Scopes and Peripheral Devices", *J. Endoscopes of Digestive Organs*, 9 (11), 1495 (November 1997), the depth of field of a magnifying-type endoscope is as narrow as 2 mm to 3 mm during proximity viewing. This is a problem in that the operator may have the endoscope's tip inserted, for example, 1 m or more into a patient's large intestine and then must manipulate the tip within a range of about plus and minus 1 mm during an operation. Thus, a very high proficiency in manipulating the tip end of the endoscope is required. In order to solve this problem it is desirable that the following conditions are satisfied in an endoscope where common observation images and proximity images are picked up by a solid-state image pick-up for display on a display device:

$WD_{wide} > WD_{tele}$      Condition (11)

$f_{L\ wide} \geq f_{L\ tele}$      Condition (12)

where $WD_{wide}$ is the working distance (i.e., the distance from the object to the nearest lens surface) at the wide-angle end (i.e., during common observation), $WD_{tele}$ is the working distance (i.e., the distance from the object to the nearest lens surface) at the telephoto end (i.e., during proximity observation), $f_{L\ wide}$ is the focal length of the optical system at the wide-angle end (i.e., during common observation), and $f_{L\ tele}$ is the focal length of the optical system at the telephoto end (i.e., during proximity observation).

Generally speaking, the magnification of an optical system is given by the following Equation (11):

$\beta = -f_L/(f_F + Z)$      Equation (11)

where $\beta$ is the magnification of the optical system,
$f_L$ is the focal length of optical system,
$f_F$ is the front focal length of the optical system, and
$Z$ is the distance from the surface of optical system to the object.

Thus, in order to increase the magnification $\beta$ of a magnifying-type endoscope as far as possible, it is necessary to reduce the distance Z as much as possible and to increase the focal length $f_L$ as much as possible.

On the other hand, as described above, if the distance Z from the surface of the optical system to the object is reduced and the focal length $f_L$ is increased, the depth of field becomes smaller, resulting in the operability of the microscope decreasing.

The purpose of Condition (11) above is to provide adequate magnification and depth of field. This is the least necessary condition to secure the needed magnification. When a magnifying-type observation is taken, a doctor scatters a colorant on a lesion site to improve the contrast of the lesion, but this sometimes causes a problem in that the reflected light from the subject becomes weaker and thus the image darkens. However, if only Condition (11) is satisfied, this darkening problem can be alleviated by decreasing the distance between an illuminating lens and the object, or by increasing the illumination intensity.

The purpose of Condition (12) above is to increase the depth of field as far as possible during proximity observation. As is apparent from Equation (9), if the focal length $f_L$ is decreased, the depth of field is increased by an amount proportional to $1/f_L^2$.

As described above, a magnifying-type endoscope with a large magnification and a wide depth of field can be provided by simultaneously satisfying both Conditions (11) and (12).

Figure 11A:
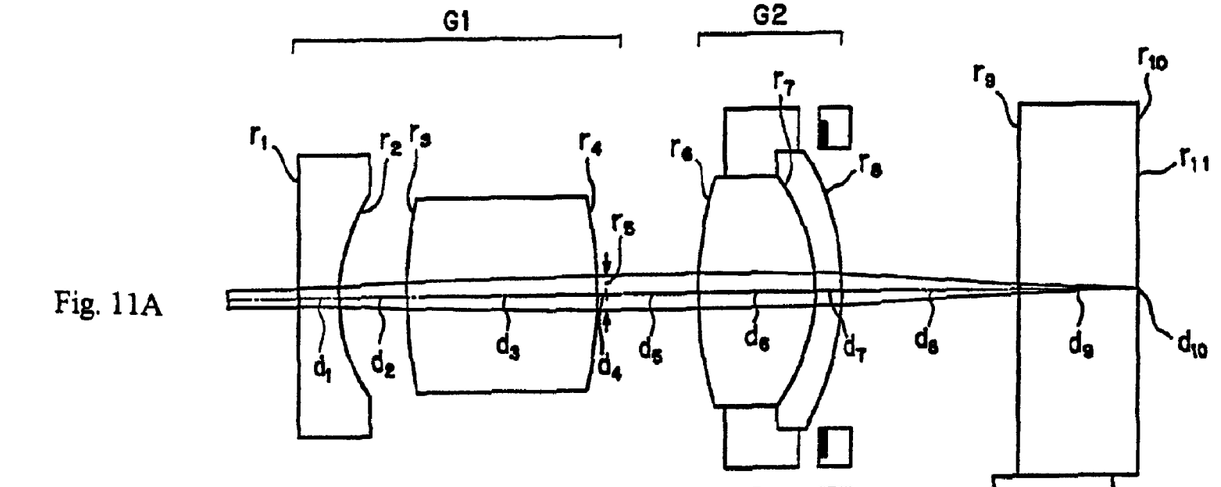
FIGS. 11A and 11B are cross-sectional views of a magnifying-type endoscope optical system of Embodiment 4 in common observation, and proximity observation, respectively.
Figure 11B:
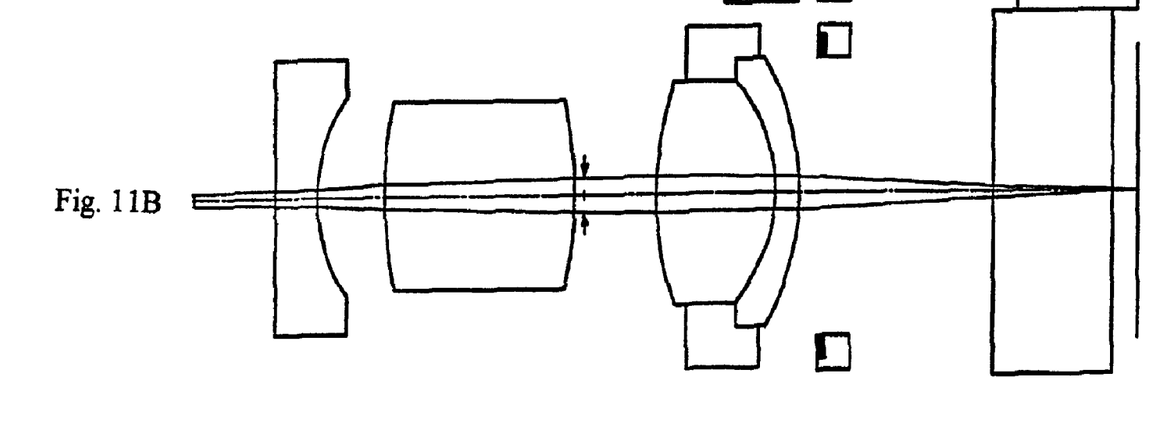

FIGS. 11A and 11B are cross-sectional views of a magnifying-type endoscope optical system of Embodiment 4 in common observation, and proximity observation, respectively. As shown in these figures, the magnifying-type endoscope optical system of Embodiment 4 is formed of, in order from the object side, a first lens group G1 and a second lens group G2, both of positive refractive power. The working distance is varied by driving the second lens group G2 along the optical axis.

The first lens group G1 is formed of, in order from the object side, a plano-concave lens element, a bi-convex lens element and a stop. The second lens group G2 is formed of a biconvex lens element that is cemented to a negative meniscus lens element.

Referring once more to FIG. 2, in this embodiment, the circular aperture 15 in the lower base 4 does not hold a third lens group. Instead, it merely passes the light that has transited the second lens group onto a solid-state image pick-up element having a detecting surface positioned at the image plane. As before, electrodes 12 and 13 are provided on the lower base and beneath the upper substrate, respectively, so that an electrostatic force is generated when these electrodes are energized to opposite potentials by a variable voltage source 14 (FIG. 1). Thus, the second lens group G2 can be moved within a range of distances along the optical axis in order to simultaneously vary the magnification and change the working distance. By such a structure, the radial dimension of the optical system of this embodiment can be nearly the same as the radial dimension of the optical systems of the prior art even if the focusing element G2 is incorporated. Therefore a variable magnifying/working distance function can be added without widening the diameter of the endoscope.

Specific numerical data will now be given for the four embodiments discussed in general terms above.

Embodiment 1

Table 1 below lists, in order from the object side, the surface number #, the radius of curvature r, the on-axis spacing d between surfaces, as well as the index of refraction $n_d$ and the Abbe number $\upsilon_d$ (at the d-line) of each optical element surface of Embodiment 1. In the bottom portion of Table 1 is listed focus data for both the common (left column) and proximity (right column) viewing limits. Namely, the focus data at each viewing limit includes: the working distance WD, the focal length $f_L$, the values of d5, d7, d12, $\beta$, $\beta R$, the product $(1-\beta^2)\beta_R^2$, and the ratio $f_2/f_L$. In addition, the values of $f_2$ and $m_2$ for this embodiment are listed.

TABLE 1

| # | r | d | $n_d$ | $\upsilon_d$ |
|---|---|---|---|---|
| 1 | ∞ | 0.4466 | 1.88300 | 40.78 |
| 2 | 0.9795 | 0.7280 | | |
| 3 | 3.8831 | 2.0580 | 1.77250 | 49.60 |
| 4 | −2.2328 | 0.0971 | | |
| 5 | ∞ (stop) | d5 (variable) | | |
| 6 | ∞ | 0.6019 | 1.88300 | 40.76 |
| 7 | −2.2328 | d7 (variable) | | |
| 8 | −4.8539 | 1.2620 | 1.69680 | 55.53 |
| 9 | −1.4018 | 0.2718 | 1.84666 | 23.78 |
| 10 | 969.8029 | 1.4820 | | |
| 11 | ∞ | 1.0000 | 1.52287 | 59.89 |
| 12 | ∞ | d12 (variable) | | |
| 13 | ∞ (image plane) | | | |

Other data:

| | | |
|---|---|---|
| WD (mm) | 12.0000 | 2.5000 |
| $f_L$ (mm) | 1.6 | 1.456 |
| d5 | 0.8472 | 0.6530 |
| d7 | 0.1553 | 0.3495 |
| d12 | 0.0000 | 0.0627 |
| $\beta$ | 0.194 | 0.109 |
| $\beta_R$ | 1.708 | 1.724 |
| $(1-\beta^2)\beta_R^2$ | 2.81 | 2.94 |
| $f_2/f_L$ | 1.58 | 1.74 |
| $f_2$ = 2.529 mm | | |
| $m_2$ = 8.61 mg | | |

Embodiment 2

Table 2 below lists, in order from the object side, the surface number #, the radius of curvature r, the on-axis spacing d between surfaces, as well as the index of refraction $n_d$ and the Abbe number $\upsilon_d$ (at the d-line) of each optical element surface of Embodiment 2. In the bottom portion of the table is listed other data for both the common (left column) and proximity (right column) viewing limits. Namely, the other data at each viewing limit includes: the working distance WD, the focal length $f_L$, the values of d5, d7, $\beta$, $\beta_R$, the product $(1-\beta^2)\beta_R^2$, and the ratio $f_2/f_L$. In addition, the values of $f_2$ and $m_2$ for this embodiment are listed.

TABLE 2

| # | r | d | $n_d$ | $\upsilon_d$ |
|---|---|---|---|---|
| 1 | ∞ | 0.4466 | 1.88300 | 40.78 |
| 2 | 0.9795 | 0.7280 | | |
| 3 | 3.8831 | 2.0580 | 1.77250 | 49.60 |
| 4 | −2.2328 | 0.0971 | | |
| 5 | ∞ (stop) | d5 (variable) | | |
| 6 | ∞ | 0.6019 | 1.88300 | 40.76 |
| 7 | −1.6000 | d7 (variable) | | |
| 8 | −2.6000 | 1.2620 | 1.69680 | 55.53 |
| 9 | −1.4018 | 0.2718 | 1.84666 | 23.78 |
| 10 | 10.0000 | 1.1903 | | |
| 11 | ∞ | 1.0000 | 1.52287 | 59.89 |
| 12 | ∞ | 0.0000 | | |
| 13 | ∞ (image plane) | | | |

Other data:

| | | |
|---|---|---|
| WD (mm) | 12.0000 | 1.4500 |
| $f_L$ (mm) | 1.547 | 1.268 |
| d5 | 0.8472 | 0.6530 |
| d7 | 0.1553 | 0.3495 |
| $\beta$ | 0.147 | 0.041 |
| $\beta_R$ | 2.186 | 2.183 |
| $(1 - \beta^2)\beta_R^2$ | 4.675 | 4.757 |
| $f_2/f_L$ | 1.17 | 1.43 |
| $f_2$ = 1.812 mm | | |
| $m_2$ = 7.64 mg | | |

Embodiment 3

Table 3 below lists, in order from the object side, the surface number #, the radius of curvature r, the on-axis spacing d between surfaces, as well as the index of refraction $n_d$ and the Abbe number $\upsilon_d$ (at the d-line) of each optical element surface of Embodiment 3. In the bottom portion of the table is listed other data for both the common (left column) and proximity (right column) viewing limits. Namely, the other data at each viewing limit includes: the working distance WD, the focal length $f_L$, the values of d5, d7, d12, $\beta$, $\beta_R$, the product $(1-\beta^2)\beta_R^2$, and the ratio $f_2/f_L$. In addition, the values of $f_2$ and $m_2$ for this embodiment are listed.

TABLE 3

| # | r | d | $n_d$ | $\upsilon_d$ |
|---|---|---|---|---|
| 1 | ∞ | 0.4466 | 1.88300 | 40.78 |
| 2 | 0.9795 | 0.7280 | | |
| 3 | 3.8831 | 2.0580 | 1.77250 | 49.60 |
| 4 | −2.2328 | 0.0971 | | |
| 5 | ∞ (stop) | d5 (variable) | | |
| 6 | ∞ | 0.6019 | 1.88300 | 40.76 |
| 7 | −4.0000 | d7 (variable) | | |
| 8 | 20.0000 | 1.2620 | 1.69680 | 55.53 |
| 9 | −1.4018 | 0.2718 | 1.84666 | 23.78 |
| 10 | −90.0000 | 1.6540 | | |
| 11 | ∞ | 1.0000 | 1.52287 | 59.89 |
| 12 | ∞ | d12 (variable) | | |
| 13 | ∞ (image plane) | | | |

Other data:

| | | |
|---|---|---|
| WD (mm) | 12.0000 | 5.0000 |
| $f_L$ (mm) | 1.636 | 1.594 |
| d5 | 0.8472 | 0.6530 |
| d7 | 0.1553 | 0.3495 |
| d12 | 0.0000 | 0.0479 |
| $\beta$ | 0.302 | 0.251 |
| $\beta_R$ | 1.123 | 1.126 |
| $(1 - \beta^2)\beta_R^2$ | 1.15 | 1.19 |
| $f_2/f_L$ | 2.77 | 2.84 |
| $f_2$ = 4.53 mm | | |
| $m_2$ = 9.58 mg | | |

Embodiment 4

Table 4 below lists, in order from the object side, the surface number #, the radius of curvature r, the on-axis spacing d between surfaces, as well as the index of refraction $n_d$ and the Abbe number $\upsilon_d$ (at the d-line) of each optical element surface of Embodiment 4. In the bottom portion of the table is listed other data for both the common (left column) and proximity (right column) viewing limits. Namely, the other data at each viewing limit includes: the working distance WD, the focal length $f_L$, the values of d5, d8, d10, $\beta$, the value $(1-\beta^2)$, and the ratio $f_2/f_L$. In addition, the values of $f_2$ and $m_2$ for this embodiment are listed.

TABLE 4

| # | r | d | $n_d$ | $\upsilon_d$ |
|---|---|---|---|---|
| 1 | ∞ | 0.4600 | 1.88300 | 40.78 |
| 2 | 2.0000 | 0.7500 | | |
| 3 | 5.9080 | 2.1200 | 1.77250 | 49.60 |
| 4 | −5.0000 | 0.1000 | | |
| 5 | ∞ (stop) | d5 (variable) | | |
| 6 | 4.0000 | 1.3000 | 1.69680 | 55.53 |
| 7 | −2.0000 | 0.2800 | 1.84666 | 23.78 |
| 8 | −3.0000 | d8 (variable) | | |
| 9 | ∞ | 1.2500 | 1.52287 | 59.89 |
| 10 | ∞ | d10 (variable) | | |
| 11 | ∞ (image plane) | | | |

Other data

| | | |
|---|---|---|
| WD (mm) | 12.0000 | 3.5000 |
| $f_L$ (mm) | 1.75 | 1.753 |
| d5 | 1.0000 | 0.8000 |
| d8 | 1.9128 | 2.1128 |
| d10 | 0.0000 | 0.2708 |
| $\beta$ | −0.1 | −0.27 |
| $(1 - \beta^2)$ | 0.99 | 0.93 |
| $f_2/f_L$ | 1.637 | 1.633 |
| $f_2$ = 2.864 mm | | |
| $m_2$ = 26.8 mg | | |

Figure 14:
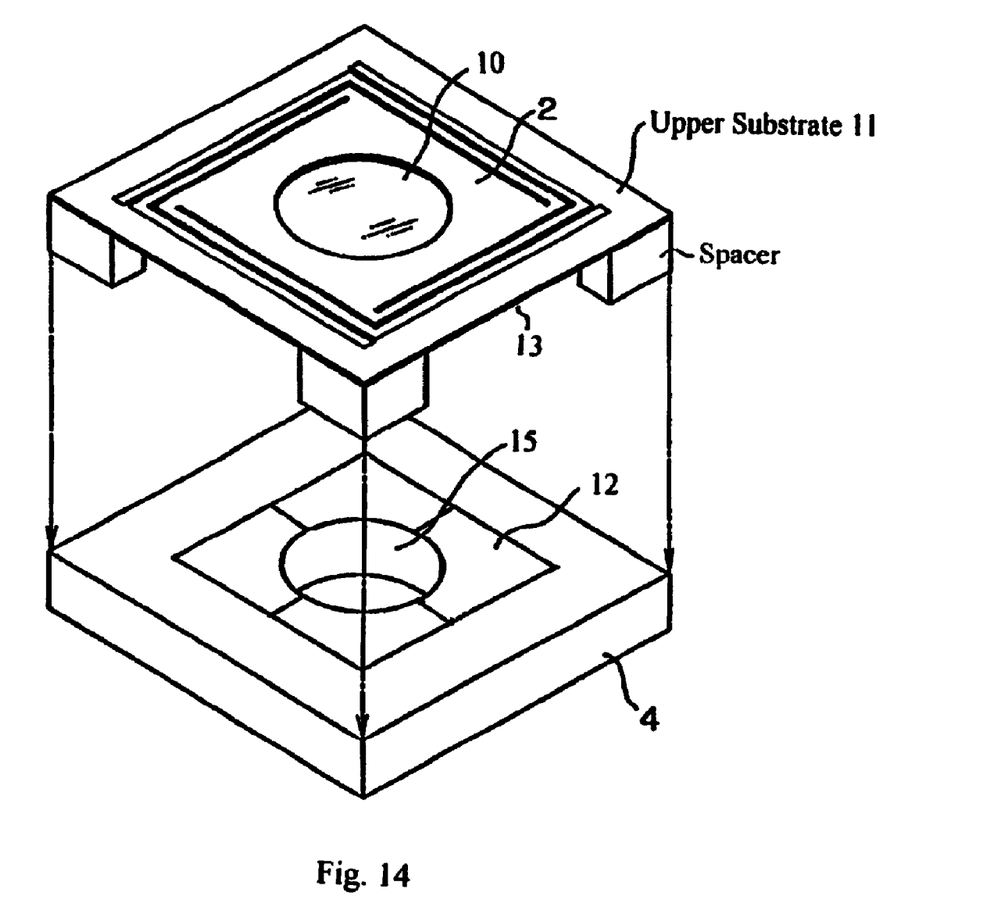

Of course, the above-discussed embodiments are not intended to be limiting. For example, FIG. 14 illustrates the electrode 12 (which corresponds to the electrode 12 shown in FIG. 2) being segmented into four quadrants, so as to enable a torque to be applied to the frame 2 in order to adjust the viewing direction of the optical system. By segmenting the electrodes into in order to adjust the viewing direction of the optical system. By segmenting the electrodes into two or more portions about the circular aperture 15, it is possible to apply various torques to the frame. Because the spring-like frame is flexible, it is thus possible to vary the direction of the optical axis of the second lens element to some extent, and to thereby vary the direction of observation to some extent. This enables the center of the field of view to be adjusted so that, for example, a lesion that otherwise would be at the periphery of the field of view can be observed nearer the center of the visual field, without changing the insertion direction of the tip of the endoscope.

The invention being thus described, it will be obvious that the same may be varied in many ways. For example, because the focusing action of the present invention is determined according to the voltage(s) input to the various electrodes, and because the characteristic of such a magnification optical system is determined according to the applied voltage values, it would be possible to display the obtained image on a monitor screen selectively, at times corresponding to a selected voltage value or values. Thus, the utilization of the optical component based on the present invention is advantageous because it gives rise to many additional capabilities. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An optical component that is capable of driving an optical lens element along an axis, said optical component comprising:

a frame for supporting the optical lens element, the frame having a first aperture therein in which the optical lens element may be mounted and flexible supports for supporting the optical lens element at a fixed position radially with respect to the axis;

a first electrode attached to said frame;

a base having a second aperture therein, said second aperture being substantially aligned with said first aperture so as to pass light which is incident onto or passed by said optical lens element when mounted in said frame, said base being fixed both radially and axially with respect to the axis;

a second electrode attached to the base; and a voltage source electrically connected to the first electrode and the second electrode for generating an electric field between said electrodes, said electric field causing the frame to move axially with respect to said base.

2. The optical component as set forth in claim 1, in combination with an image pick-up optical system which includes an optical lens element that is driven by said optical component.

3. The device according to claim 2, wherein said image pick-up optical system includes, in order from the object side, a first lens group of positive refractive power and a second lens group of positive refractive power, said second lens group including said optical lens element that is driven by said optical component.

4. The device according to claim 3, wherein the following conditions are satisfied:

$$WD_{wide} > WD_{tele} \text{ and}$$

$$f_{L\,wide} \geq f_{L\,tele}$$

where $WD_{wide}$ is the working distance of the image pick-up system in common observation, $WD_{tele}$ is the working distance of the image pick-up system in proximity observation, $f_{Lwide}$ is the focal length of the image pick-up system in common observation, and $f_{Ltele}$ is the focal length of the image pick-up system in proximity observation.

5. The device according to claim 3, wherein the following condition is satisfied:

$$0.9 < (1-\beta^2)$$

where $\beta$ is the magnification of the second lens group.

6. The device according to claim 3, wherein the following conditions are satisfied:

$$1 < f_2/f_{Lwide} \text{ and}$$

$$f_2/f_{Ltele} < 2.9$$

where $f_2$ is the focal length of the second lens group, $f_{Lwide}$ is the focal length of the optical pick-up system in common observation, and $f_{Ltele}$ is the focal length of the optical pick-up system in proximity observation.

7. The device according to claim 3, wherein the following condition is satisfied:

$$m_2 < 30 \text{ (mg)}$$

where $m_2$ is the mass of the optical lens element that is driven by said optical component.

8. The device according to claim 2, said image pick-up optical system comprising, in order from the object side:

a first lens group of positive refractive power;

a second lens group of positive refractive power, said second lens group including said optical lens element that is driven by said optical component; and a third lens group of negative refractive power.

9. The device according to claim 8, wherein the following conditions are satisfied:

$$WD_{wide} > WD_{tele} \text{ and}$$

$$f_{Lwide} \geq f_{Ltele}$$

where $WD_{wide}$ is the working distance of the image pick-up system in common observation, $WD_{tele}$ is the working distance of the image pick-up system in proximity observation, $f_{Lwide}$ is the focal length of the image pick-up system in common observation, and $f_{Ltele}$ is the focal length of the image pick-up system in proximity observation.

10. The device according to claim 8, wherein the following condition is satisfied:

$$1 < (1-\beta^2)\beta_R^2$$

where

β is the magnification of the second lens group, and $\beta_R$ is the magnification of the third lens group.

11. The device according to claim 8, wherein the following condition is satisfied:

$$1.8 < (1-\beta^2)\beta_R^2$$

where

β is the magnification of the second lens group, and $\beta_R$ is the magnification of the third lens group.

12. The device according to claim 8, wherein the following conditions are satisfied:

$$1 < f_2/f_{Lwide} \text{ and}$$

$$f_2/f_{Ltele} < 2.9$$

where $f_2$ is the focal length of the second lens group, $f_{Lwide}$ is the focal length of the optical pick-up system in common observation, and $f_{Ltele}$ is focal length of the optical pick-up system in proximity observation.

13. The device according to claim 8, wherein the following condition is satisfied:

$$m_2 < 30 \text{ (mg)}$$

where $m_2$ is the mass of the optical lens element that is driven by said optical component.

14. The device according to claim 2, wherein the optical lens element that is driven by said optical component has a positive refractive power.

15. The device according to claim 2, wherein the following conditions are satisfied:

$$WD_{wide} > WD_{tele} \text{ and}$$

$$f_{Lwide} \geq f_{Ltele}$$

where $WD_{wide}$ is the working distance of the image pick-up system in common observation, $WD_{tele}$ is the working distance of the image pick-up system in proximity observation, $f_{Lwide}$ is the focal length of the image pick-up system in common observation, and $f_{Ltele}$ is the focal length of the image pick-up system in proximity observation.

16. The device according to claim 2, wherein the periphery of said frame has substantially the same shape as the periphery of the optical lens element that is driven by said optical component.

17. The device according to claim 2, wherein the periphery of said base has substantially the same shape as the periphery of the optical lens element that is driven by said optical component.

18. The device according to claim 2, and further including a fixed optical lens arranged in said second aperture.

19. The device according to claim 2, and further comprising a stop on the object side of the optical lens element that is driven by said optical component.

20. The device according to claim 2, wherein the following condition is satisfied:

$$m_2 < 30 \text{ (mg)}$$

where $m_2$ is the mass of the optical lens element that is driven by said optical component.

21. The optical component of claim 1, wherein one of said electrodes is subdivided into multiple parts so that a torque can be applied to said frame using electrostatic forces.

* * * * *